US011539217B2

(12) United States Patent
Zimmanck (10) Patent No.: US 11,539,217 B2
(45) Date of Patent: Dec. 27, 2022

(54) METHOD AND APPARATUS FOR TERTIARY CONTROL OF MICROGRIDS WITH INTEGRATED OVER-CURRENT PROTECTION

(71) Applicant: Enphase Energy, Inc., Petaluma, CA (US)

(72) Inventor: Donald Richard Zimmanck, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 209 days.

(21) Appl. No.: 17/083,226

(22) Filed: Oct. 28, 2020

(65) Prior Publication Data

US 2021/0126467 A1 Apr. 29, 2021

Related U.S. Application Data

(60) Provisional application No. 62/927,053, filed on Oct. 28, 2019.

(51) Int. Cl.
*H02J 3/38* (2006.01)
*H02H 9/02* (2006.01)
(Continued)

(52) U.S. Cl.
CPC .............. *H02J 3/388* (2020.01); *G05F 1/66* (2013.01); *G06Q 10/06315* (2013.01);
(Continued)

(58) Field of Classification Search
CPC ........ H02J 3/388; H02J 3/003; H02J 2310/60; H02J 3/0075; H02J 2203/20;
(Continued)

(56) References Cited

U.S. PATENT DOCUMENTS 9,118,205 B2 * 8/2015 Ou ............................ H02J 3/06
10,276,321 B2 * 4/2019 Kennedy .................. H01H 9/54
(Continued)

FOREIGN PATENT DOCUMENTS

CN 101893654 A 11/2010
CN 102611106 A 7/2012
(Continued)

OTHER PUBLICATIONS

Notification Of Transmittal Of The International Search Report And The Written Opinion Of The International Searching Authority, Or The Declaration, International application No. PCT/US2020/057791, dated Feb. 16, 2021.

*Primary Examiner* — Mohammad Ali
*Assistant Examiner* — Dhruvkumar Patel
(74) *Attorney, Agent, or Firm* — Moser Taboada (57) ABSTRACT

A method and apparatus for tertiary control with over-current protection. In one embodiment, the method comprises calculating at least one unconstrained optimal net intertie target for an area of a power network; calculating, for each resource within the area, optimal scheduled current to achieve the at least one unconstrained optimal net intertie target; calculating, using the optimal scheduled currents and a plurality of stress coefficients, net scheduled current for each power line segment within the area; comparing the net scheduled currents to corresponding stress thresholds to identify any stress violations; reducing, when the comparing step identifies one or more stress violations, the optimal scheduled current for one or more resources contributing to the one or more stress violations; and calculating, when the comparing step identifies the one or more stress violations, updated optimal scheduled current for one or more resources not contributing to the one or more stress violations.

20 Claims, 4 Drawing Sheets

(51) Int. Cl.
| | |
|---|---|
| *H02H 3/06* | (2006.01) |
| *H02J 3/00* | (2006.01) |
| *H02H 7/26* | (2006.01) |
| *G05F 1/66* | (2006.01) |
| *G06Q 50/06* | (2012.01) |
| *G06Q 10/06* | (2012.01) |
| *H02H 3/08* | (2006.01) |

(52) U.S. Cl.
CPC ............... *G06Q 50/06* (2013.01); *H02H 3/06* (2013.01); *H02H 3/08* (2013.01); *H02H 7/26* (2013.01); *H02H 9/02* (2013.01); *H02J 3/003* (2020.01); *H02J 2310/60* (2020.01)

(58) Field of Classification Search
CPC .......... H02J 2310/10; G06Q 10/06315; G06Q 50/06; G05F 1/66; H02H 3/06; H02H 3/08; H02H 7/26; H02H 9/02; H02H 3/033; Y02E 60/00; Y04S 40/20
See application file for complete search history.

(56) References Cited

U.S. PATENT DOCUMENTS

| | | | |
|---|---|---|---|
| 2014/0229029 A1* | 8/2014 | Chu ................ | H02H 3/006 700/293 |
| 2015/0346286 A1* | 12/2015 | Janssen .............. | H02H 7/261 702/58 |
| 2016/0313716 A1 | 10/2016 | Chen et al. | |
| 2017/0149379 A1 | 5/2017 | Rowe et al. | |

FOREIGN PATENT DOCUMENTS

| | | |
|---|---|---|
| CN | 102664417 A | 9/2012 |
| CN | 101893654 B | 11/2012 |
| CN | 103427484 A | 12/2013 |
| CN | 102611106 B | 4/2014 |
| CN | 103762601 A | 4/2014 |
| CN | 104111151 A | 10/2014 |
| CN | 104699064 A | 6/2015 |
| CN | 104834339 A | 8/2015 |
| CN | 105098776 A | 11/2015 |
| CN | 103427484 B | 4/2016 |
| CN | 105515010 A | 4/2016 |
| CN | 105552934 A | 5/2016 |
| CN | 104699064 B | 3/2017 |
| CN | 104111151 B | 10/2017 |
| CN | 107276220 A | 10/2017 |
| CN | 107732892 A | 2/2018 |
| CN | 108020781 A | 5/2018 |
| CN | 108462209 A | 8/2018 |
| CN | 105515010 B | 11/2018 |
| CN | 108963959 A | 12/2018 |
| CN | 109239523 A | 1/2019 |
| CN | 105552934 B | 2/2019 |
| CN | 109361242 A | 2/2019 |
| CN | 109426889 A | 3/2019 |
| CN | 107732892 B | 4/2019 |
| EP | 3396802 A1 | 10/2018 |
| WO | WO-2019053588 A1 * 3/2019 | ......... G01R 19/2513 |
| WO | WO-2019136161 A1 * 7/2019 | ........... G05B 19/042 |

* cited by examiner

METHOD AND APPARATUS FOR TERTIARY CONTROL OF MICROGRIDS WITH INTEGRATED OVER-CURRENT PROTECTION

CROSS-REFERENCE TO RELATED APPLICATIONS

This application claims benefit of U.S. provisional patent application Ser. No. 62/927,053, entitled "Tertiary Control of Microgrids with Integrated Over-Current Protection" and filed Oct. 28, 2019, which is herein incorporated in its entirety by reference.

BACKGROUND OF THE INVENTION

Field of the Invention

Embodiments of the present disclosure relate generally to tertiary control for power systems, and, more particularly, to tertiary control with over-current protection.

Description of the Related Art

"Tertiary Control" is the term used to describe the control system which optimizes the flow of power through an interconnected power system in order to optimize the "area economy" (i.e., minimize cost of operation). There are a variety of techniques employed to accomplish this, but most use some sort of hierarchical marketplace structure.

A hierarchical marketplace breaks up the grid into control areas. All resources place "bids" into the local marketplace and a manager determines the optimal dispatch for all participants which meets the net area requirement (local demand+net intertie requirement) at the lowest possible cost. If the area is part of a larger network, the manager also generates an aggregate bid based on the local result and places 1 aggregate bid into the upstream marketplace, which then updates a new optimal dispatch for each sub-area in its domain. This process repeats periodically for each hierarchical level of the power system.

Marketplace managers in practical power systems also must take care not to operate the network outside of a safe operating range. The flow of power that may be technically optimal from an operating cost point of view may over-current sections of transmission of distribution lines or place too much dependence on power being provided from a few sections of interconnection equipment, making the entire system vulnerable to failure.

When these factors are considered, it is known as "resource constrained" economic dispatch and solving the resource constrained dispatch is generally known in the field as Optimal-Power-Flow (OPF) analysis.

Today's utilities generally must deal with very complex networks and associated network constraints, and thus use complex numerical solvers to attack the problem. As more distributed resources get applied within the distribution system of the grid, the number of nodes these solvers need to handle increases exponentially making them impractical for use in such a distributed power system.

Therefore, there is a need in the state-of-the art for simpler more distributed resource constrained optimization.

SUMMARY OF THE INVENTION

Embodiments of the present invention generally relate to tertiary control of power systems as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for coordinated over-current protection on distribution systems as part of the general tertiary control process. Such an over-current protection scheme enables microgrids to utilize small, and thereby cost efficient, distribution wires. For existing distribution systems, the techniques described herein enables higher levels of over-subscription, thereby allowing more loads to be served by existing equipment.

Figure 1:
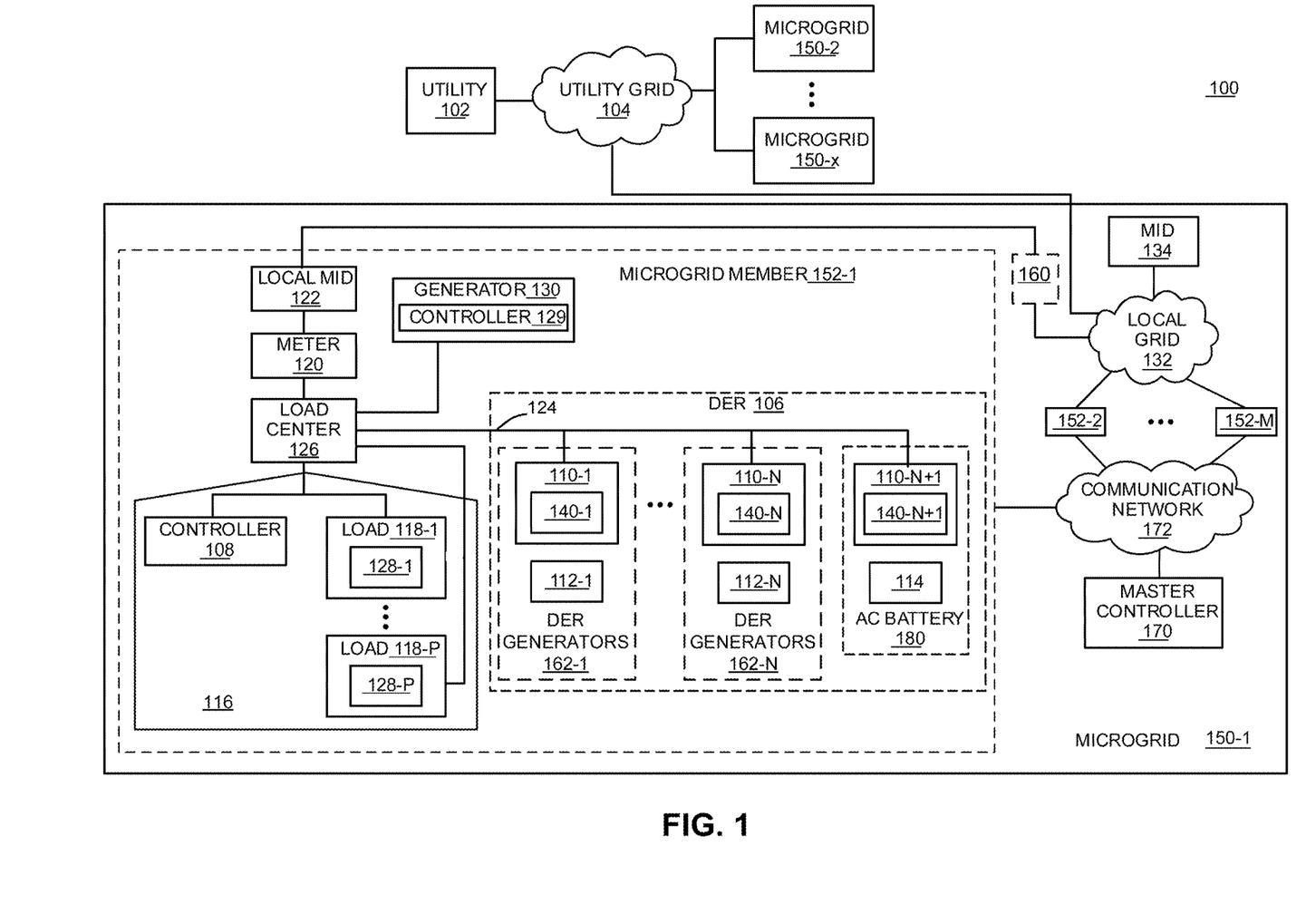
FIG. 1 is a block diagram of a power system in accordance with one or more embodiments of the present invention.

FIG. 1 is a block diagram of a power system 100 in accordance with one or more embodiments of the present invention. This diagram only portrays one variation of the myriad of possible system configurations. The present invention can function in a variety of environments and systems.

The power system 100 comprises a utility 102 (such as a conventional commercial utility) and a plurality of microgrids 150-1, 150-2, ..., 150-X (collectively referred to as microgrids 150) coupled to the utility 102 via a utility grid 104 (e.g., a three-phase utility grid). Through their connections to the utility grid 104, each microgrid 150 as a whole may receive energy from the utility grid 104 or may place energy onto the utility grid 104. In some embodiments, coupling energy to a commercial utility grid is strictly controlled by regulation and the microgrids 150 maintain or strive to maintain a zero-energy output policy.

Each microgrid 150 is capable of operating without energy supplied from the utility 102 and may cover a neighborhood, a village, a small city, or the like, as the term "microgrid" is not intended to imply a particular system size.

Although the microgrid 150-1 is depicted in detail in FIG. 1 and described herein, the microgrids 150-2 through 150-X are analogous to the microgrid 150-1. However, the number and/or type of various microgrid components may vary among the microgrids 150.

The microgrid 150-1 comprises a plurality of microgrid members 152-1, 152-2, . . . , 152-M (collectively referred to as microgrid members 152), each of which is a microgrid that can operate when isolated from the rest of the microgrid 150. The microgrid members 152 are coupled to a local grid 132 which in turn is coupled to the utility grid 104 via a microgrid interconnect device (MID) 134 (which may also be referred to as an island interconnect device, or IID). The local grid 132 may be a trunk of the utility grid 104 or it may be a specifically designed local grid for the microgrid 150-1. In some embodiments the local grid 132 may be a three-phase grid, although in other embodiments it may be a single-phase grid.

The MID 134 generally comprises a controller having a processor (not shown) and determines when to disconnect/connect the microgrid 150-1 from/to the utility grid 104 and performs the disconnection/connection (although in some embodiments the MID 134 may receive instructions from another component or system for disconnecting from/connecting to the utility grid 104). When connected to the utility grid 104, the microgrid 150-1 operates in a grid-connected (GC) mode; when disconnected from the utility grid 104, the microgrid 150-1 operates in an islanded (IS) mode. For example, the MID 134 may detect a fluctuation, disturbance or outage with respect to the utility grid 104 and, as a result, disconnect the microgrid 150-1 from the utility grid 104. The MID 134 may also disconnect the microgrid 150-1 from the utility grid 104 when the microgrid 150-1 is either overproducing energy or overloading the utility grid 104. Once disconnected from the utility grid 104, the microgrid 150-1 can continue to generate power as an intentional island without imposing safety risks on any line workers that may be working on the utility grid 104. The MID 134 may additionally comprise a transceiver (not shown) for communicating with one or more of the microgrid components. In certain embodiments the MID 134 may send command and control signals to one or more microgrid member components (e.g., the controller 108, the power conditioners 110, the generator 130, and the loads 118), such as secondary control instructions (e.g., active and reactive current commands to resource controllers), which may be generated by the MID 134 or received from another device.

The microgrid member 152-1 comprises a building 116 (e.g., a residence, commercial building, or the like) coupled to a load center 126 which may be within or outside of the building 116. The load center 126 is coupled to the local grid 132 via a utility meter 120 and a local MID 122, a distributed energy resource (DER) 106, a generator 130, and a plurality of loads 118-1 . . . 118-P (collectively referred to as loads 118) for coupling power among these components. Although the microgrid member 152-1 is depicted in detail in FIG. 1 and described herein, the microgrid members 152-2 through 152-M are analogous to the microgrid member 152-1. However, the number and/or types of various microgrid member components may vary among the microgrid members 152.

The local MID 122 generally comprises a controller having a processor (not shown) and determines when to disconnect/connect the microgrid member 152-1 from/to the local grid 132 and performs the disconnection/connection (although in some embodiments the local MID 122 may receive instructions from another component or system for disconnecting from/connecting to the local grid 132). For example, the local MID 122 may detect a grid fluctuation, disturbance or outage and, as a result, disconnect the microgrid member 152-1 from the local grid 132. The MID 122 may also disconnect the microgrid member 152-1 from the local grid 132 when the microgrid member 152-1 is either overproducing energy or overloading the local grid 132. When connected to the local grid 132, the microgrid member 152-1 operates in a grid-connected (GC) mode; when disconnected from the local grid 132, the microgrid member 152-1 operates in an islanded (IS) mode. Once disconnected from the local grid 132, the microgrid member 152-1 can continue to generate power as an intentional island without imposing safety risks on any line workers that may be working on the local grid 132. The local MID 122 may comprise a transceiver (not shown) for communicating with one or more of the microgrid member components. In certain embodiments the MID 122 may send command and control signals to one or more of the controller 108, the power conditioners 110, the generator 130, and the loads 118 (e.g., secondary control instructions, such as active and reactive current commands to resource controllers, which may be generated by the MID 122 or received from another device).

The meter 120 measures the ingress and egress of energy for the microgrid member 152-1; in some embodiments, the meter 120 comprises the MID 122 or a portion thereof. The meter 120 generally measures active power flow (kWh), reactive power flow (kVAR), grid frequency, and grid voltage (referred to herein as the measured parameters). In certain embodiments these measured parameters may be communicated to a microgrid monitoring system (not shown) that monitors each of the microgrid members 152.

The DER 106 comprises power conditioners 110-1 . . . 110-N, 110-N+1 coupled in parallel to a bus 124 that is further coupled to the load center 126. Generally, the power conditioners 110 are bi-directional inverters and a first subset of the power conditioners 110 generate power from DC energy sources (e.g., renewable energy sources such as wind, solar, hydro, and the like) while a second subset of the power conditioners 110 generate power from/couple energy to energy storage/delivery devices (e.g., batteries or the like). The combination of a DC energy source and a corresponding power conditioner 110 may be referred to herein as a DER generator (e.g., DER generators 162-1 through 162-N). In those embodiments where the power conditioners 110 are DC-AC inverters, a power conditioner 110 coupled to an energy storage/delivery device may together be referred to as an AC battery; in those embodiments where the power conditioners 110 are DC-DC converters, a power conditioner 110 coupled to an energy storage/delivery device may together be referred to as a battery DC supply.

In one or more embodiments, such as the embodiment depicted in FIG. 1, the power conditioners 110-1 . . . 110-N are respectively coupled to DC energy sources 112-1 . . . 112-N (e.g., renewable energy sources such as wind, solar, hydro, and the like) for receiving DC power and generating commercial grid-compliant AC power that is coupled to the bus 124. In some of these embodiments, each DC source 112 is a photovoltaic (PV) module. In some alternative embodiments, multiple DC sources 112 are coupled to a single power conditioner 110 (e.g., a single, centralized power conditioner).

As further depicted in FIG. 1, the power conditioner 110-N+1 is coupled to an energy storage/delivery device 114 to form an AC battery 180. The power conditioner 110 of the AC battery 180 can convert AC power from the bus 124 to energy that is stored in the energy storage/delivery device 114, and can further convert energy from the energy storage/delivery device 114 to commercial grid-compliant AC power that is coupled to the bus 124. The energy storage/delivery device 114 may be any energy storage device having a "charge level", such as a battery, flywheel, compressed air storage, or the like. Although only a single AC battery 180 is depicted in FIG. 1, other embodiments may comprise more AC batteries 180 or even no AC batteries 180.

Each of the power conditioners 110 comprises a power conditioner controller 140 for controlling the corresponding power conditioner 110, which may include primary control techniques such as implementing droop control techniques that allow the power conditioners 110 to share the load in a safe and stable manner when the microgrid member 152-1 is disconnected from the utility 102 or the local grid 132 (or, alternatively, when operating in a grid-connected mode).

A controller 108 is coupled to the bus 124 via the load center 126 and communicates with the power conditioners 110, the generator 130, and the loads 118 (e.g., via power line communications (PLC) and/or other types of wired and/or wireless techniques). The controller 108 may send command and control signals to one or more of the power conditioners 110, the generator 130, and the loads 118 (e.g., secondary control instructions, such as active and reactive current commands to resource controllers, which may be generated by the controller 108 or received from another device) and/or receive data (e.g., status information, performance data, and the like) from one or more of the power conditioners 110, the generator 130, and the loads 118. In some embodiments, the controller 108 may be a gateway that is further coupled, by wireless and/or wired techniques, to a master controller 170 via a communication network 172 (e.g., the Internet) for communicating data to/receiving data from the master controller 170 (e.g., performance information, alarms, messages, control instructions, and the like). In some embodiments the master controller 170 may send command and control signals to one or more of the controller 108, the power conditioners 110, the generator 130, and the loads 118 (e.g., secondary control instructions, such as active and reactive current commands to resource controllers, which may be generated by the master controller 170 or received from another device).

In certain embodiments, the controller 108 comprises the local MID 122 or a portion of the local MID 122 (e.g., an islanding module for monitoring grid health, detecting grid failures and disturbances, determining when to disconnect from/connect to the local grid 132, and driving a disconnect component accordingly, where the disconnect component may be part of the controller 108 or, alternatively, separate from the DER controller 108). In some embodiments, the controller 108 may coordinate with the local MID 122, e.g., using PLC.

Although the microgrid member 152-1 is depicted in FIG. 1 as having a single DER 106, in other embodiments the microgrid member 152-1 may have additional DERs, each of which may be different types of DERs (e.g., solar, wind, and the like). In some alternative embodiments, the DER controller 108 and the DER generators 162 are absent from the microgrid member 152-1 and the DER 106 comprises only one or more AC batteries 180.

The generator 130 is an energy generator, such as a diesel generator, that automatically increases or curtails energy output depending on the needs of the microgrid member 152-1. The generator 130 comprises a generator controller 129. The generator controller 129 may optimize the operation of the generator 130 with respect to the microgrid member 152-1 and/or the microgrid 150-1 (e.g., by generating control instructions for the generator 130); implement control instructions for operating the generator 130 (e.g., instructions received from another component, such as the controller 108, or from another system); obtain data pertaining to the generator 130 (e.g., performance data, operational data, or the like) which may further be communicated to another component or system; or perform similar functions. The generator controller 129 may implement droop control techniques to control operation of the generator 130 when the microgrid member 152-1 is operating in an islanded mode, although in some alternative embodiments the generator 130 may also be controlled using droop control when operating in a grid-connected mode.

In one or more embodiments, the power conditioners 110 and the generator 130 are droop-controlled such that when the microgrid member 152-1 is disconnected from the local grid 132 or the utility grid 104 (e.g., using the MID 122 and/or the MID 134) and operating in an autonomous mode, the power conditioners 110 and the generator 130 employ the same droop control technique for parallel operation without the need for any common control circuitry or communication among the components.

The loads 118 are non-critical loads (e.g., hot water heaters, refrigerators, HVAC equipment, pumps, electric cars, room lighting, and the like) that consume energy from the transmission line electrically interconnecting the microgrid components (which may be referred to as the microgrid member grid, the microgrid grid, or simply the grid) obtained via the load center 126. Although the loads 118 are depicted in FIG. 1 as within the building 116, one or more of the loads 118 may be located outside of the building 116. The loads 118 may be static loads, dynamic loads, or some combination thereof (i.e., some of the loads 118 are static loads while others are dynamic loads).

The loads 118 are intelligent loads (which may also be referred to as "smart loads") that each comprise a load controller 128, for controlling operation of the corresponding load 118 (e.g., for implementing preset control instructions and/or control instructions received, for example via PLC, from another component, such as the controller 108), obtaining data pertaining to the corresponding load 118 (e.g., performance data, operational data, and the like) which may further be communicated to another component or system; and/or performing similar functions.

Each of the controllers 108, 128, 129, 140, and 170 may be comprised of hardware, software, or a combination thereof, and may in certain embodiments comprise a central processing unit (CPU) coupled to each of support circuits and a memory. Each of the controllers 108, 128, 129, 140, and 170 may be implemented using a general purpose computer that, when executing particular software, becomes a specific purpose computer for performing various embodiments of the present invention. In those embodiments where a controller includes a CPU, the CPU may comprise one or more conventionally available microprocessors, microcontrollers and the like, which are capable of performing the processing described herein; e.g., the CPU may be a microcontroller comprising internal memory for storing controller firmware that, when executed, provides the functionality described herein. In certain embodiments, the CPU may include one or more application specific integrated circuits (ASICs). The support circuits coupled to the CPU are well known circuits used to promote functionality of the CPU (e.g., a cache, power supplies, clock circuits, buses, network cards, input/output (I/O) circuits, and the like). The memory coupled to the CPU may comprise random access memory, read only memory, removable disk memory, flash memory, and various combinations of these types of memory. The memory is sometimes referred to as main memory and may, in part, be used as cache memory or buffer memory. The memory generally stores the operating system (OS) of the controller, which may be one of a number of commercially available OSs such as, but not limited to, Linux, Real-Time Operating System (RTOS), and the like. The memory generally stores various forms of application software that, when executed, performs one or more functions described herein.

The techniques described herein work by requiring each marketplace manager to first calculate the economically optimal power-flows ignoring all local network constraints. The manager then calculates the net power-flows on each segment of power-line with a "K-matrix", which is a function of the network design and contains information on the contribution current injection on each bus has to the overall current on each segment of the power network. The "K-matrix" will be M×N where M is the number of segments in the system and N is the number of buses on the system with a current injection. This approach is much simpler to the generalized admittance matrix of a power system (i.e. "Y-matrix") because there's no concern about system voltages or modelling contribution from buses which have no current.

Once the marketplace manager analyses the total current on each segment, it compares it to allowable levels, which could be time/temperature dependent or based on some other dynamic limit calculation. If the tertiary controller calculates scheduled interties which violate any stress thresholds, then the scheduled currents in one or more of the resources (which may include both current generators and loads) contributing stress current must be reduced and we must re-do the tertiary optimization. In order to do this optimally, the system is split into two groups. Group A comprises the resources/loads which contribute to the current on the overloaded segment, and group B comprises the resources that do not. The net intertie for group A is set to the stress limit, and the new net intertie of Group B so that the total net current of Group A and B is unchanged. The tertiary biases of all resources in Group A and Group B are then recalculated separately. Afterwards, the stress calculation is recalculated on just Group B (i.e. the Group A rows are removed from the K matrix and the resource currents). This process is repeated until either there are no longer any stress violations, or there is only 1 row left. If the process gets down to a single row that is overloaded, that means that there is NO solution which meets the stress requirement, in which case a notification may be generated, for example an emergency SYSTEM WIRING OVERLOAD warning is flagged and the entire process is re-run with an increased stress matrix (i.e., increase by an amount, such as 10%, and try again, if still no solution increase another amount, such as another 10%, and so on and so forth).

Figure 2:
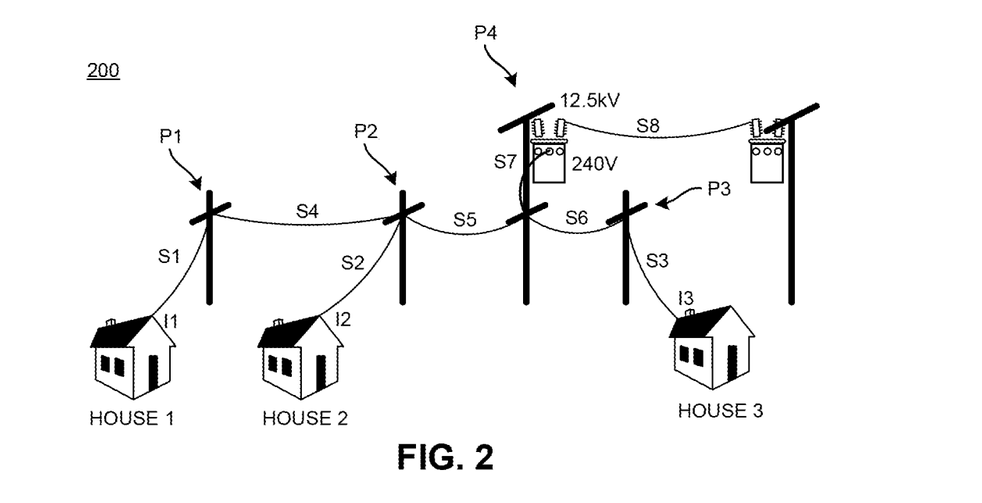
FIG. 2 is an illustration of a power network in accordance with one or more embodiments of the present invention.

FIG. 2 is an illustration of a power network 200 in accordance with one or more embodiments of the present invention. The power network 200 is an exemplary network for illustrating the tertiary control described herein.

The power network 200 is an area comprising Houses 1, 2, and 3, coupled to a power distribution grid. The power network 200 comprises a high-voltage power line segment S8 coupled to a power line segment S7 via a step-down transformer at a pole P4. The House H1, which comprises one or more resources to generate a current I1, is coupled to a power line segment S1; the House H2, which comprises one or more resources to generate a current I2, is coupled to a power line segment S2; and the House H3, which comprises one or more resources to generate a current I3, is coupled to a power line segment S3. The power line segment S1 is further coupled at the pole P1 to a power line segment S4, which runs between the poles P1 and P2, The power line segment S2 is further coupled at the pole P2 to the power line segment S5, which runs between the poles P2 and P4 and is coupled to the segment S7 at the pole P4. The power line segment S3 is further coupled at the pole P3 to the power line segment S6, which runs between poles P3 and P4 and is coupled to the segment S7 at the pole P4.

The first step in this process is to derive the K-matrix. Because of the simplicity of this network, the matrix can be inferred directly to generate the K-matrix shown in Equation (1):

$$K = \begin{bmatrix} 1 & 0 & 0 \\ 0 & 1 & 0 \\ 0 & 0 & 1 \\ 1 & 0 & 0 \\ 1 & 1 & 0 \\ 0 & 0 & 1 \\ 1 & 1 & 1 \\ 0.02 & 0.02 & 0.02 \end{bmatrix} \quad (1)$$

The first iteration of the tertiary controller calculates an optimal dispatch of I1=+30 A from House 1, I2=+20 A from House 2, and I3=−50 A from House 3.

The K-matrix is now used to calculate the current on each section of wire as shown in Equation (2):

$$\begin{bmatrix} S1 \\ S2 \\ S3 \\ S4 \\ S5 \\ S6 \\ S7 \\ S8 \end{bmatrix} = K \begin{bmatrix} I1 \\ I2 \\ I3 \end{bmatrix} = \begin{bmatrix} 1 & 0 & 0 \\ 0 & 1 & 0 \\ 0 & 0 & 1 \\ 1 & 0 & 0 \\ 1 & 1 & 0 \\ 0 & 0 & 1 \\ 1 & 1 & 1 \\ 0.02 & 0.02 & 0.02 \end{bmatrix} \begin{bmatrix} 30 \\ 20 \\ -50 \end{bmatrix} = \begin{bmatrix} 30 \\ 20 \\ -50 \\ 30 \\ 50 \\ -50 \\ 0 \\ 0 \end{bmatrix} \quad (2)$$

In some embodiments, one or more houses may have wiring with a maximum allowable current less than the maximum allowable current for the wiring of other houses. For example, House 1 may be built far away from the other houses and in order to save costs, its wiring can only handle 20 A, whereas all other elements of the distribution system were designed to handle 100 A. In such an embodiment, the violation in rows 1 and 4 can be observed as shown in (3):

$$\begin{bmatrix} |50| > 20 \\ |20| > 100 \\ |-50| > 100 \\ |30| > 20 \\ |50| > 100 \\ |-50| > 100 \\ |0| > 100 \\ |0| > 100 \end{bmatrix} = \begin{bmatrix} \text{TRUE} \\ \text{FALSE} \\ \text{FALSE} \\ \text{TRUE} \\ \text{FALSE} \\ \text{FALSE} \\ \text{FALSE} \\ \text{FALSE} \end{bmatrix} \quad (3)$$

Accordingly, the algorithm would first split the control areas into two groups, those contributing to the first violation, and those not. To see what interties are contributing to the over-stress on row 1, the non-zero values of row 1 of the K matrix are identified as shown in (4).

$$K[1,i]=[1\ 0\ 0]$$

It can therefore be seen that only the Home 1 intertie contributes to this over-stress. This is then separated into a separate control area and the target intertie set to 20 A in order to max out that distribution element. Homes 2 and 3 would be split into a second control area with a new net intertie of −20 A to keep the original 0 A total net intertie for both areas. At this point, the tertiary controller would re-calculate the optimal interties for the individual systems that make up each control area. Area 1 now just consists of House 1, so its intertie will just be 20 A. If, for example, the tertiary calculation results in a 25 A export for House 2 and a 45 A import for House 3. As shown in Equation (5), the stress calculation now becomes:

$$\begin{bmatrix} S1 \\ S2 \\ S3 \\ S4 \\ S5 \\ S6 \\ S7 \\ S8 \end{bmatrix} = K \begin{bmatrix} I1 \\ I2 \\ I3 \end{bmatrix} = \begin{bmatrix} 1 & 0 & 0 \\ 0 & 1 & 0 \\ 0 & 0 & 1 \\ 1 & 0 & 0 \\ 1 & 1 & 0 \\ 0 & 0 & 1 \\ 1 & 1 & 1 \\ 0.02 & 0.02 & 0.02 \end{bmatrix} \begin{bmatrix} 20 \\ 25 \\ -45 \end{bmatrix} = \begin{bmatrix} 20 \\ 25 \\ -45 \\ 20 \\ 25 \\ -45 \\ 0 \\ 0 \end{bmatrix} \quad (5)$$

It can be seen that this has resolved the over-stress in both rows 1 and 4. The reason for this is that rows 1 and 4 of the stress coefficient matrix K are identical (i.e. Elements 1 and 4 always have the same current going through them). So, when the stress in 1 row was resolved, it automatically resolved the stress in the other. In order to improve the efficiency of the OCP algorithm, the matrix may be initially reduced by removing all the rows which have a duplicate that has the same or lower max current allowance (i.e. only need to protect the weakest link).

Figure 3:
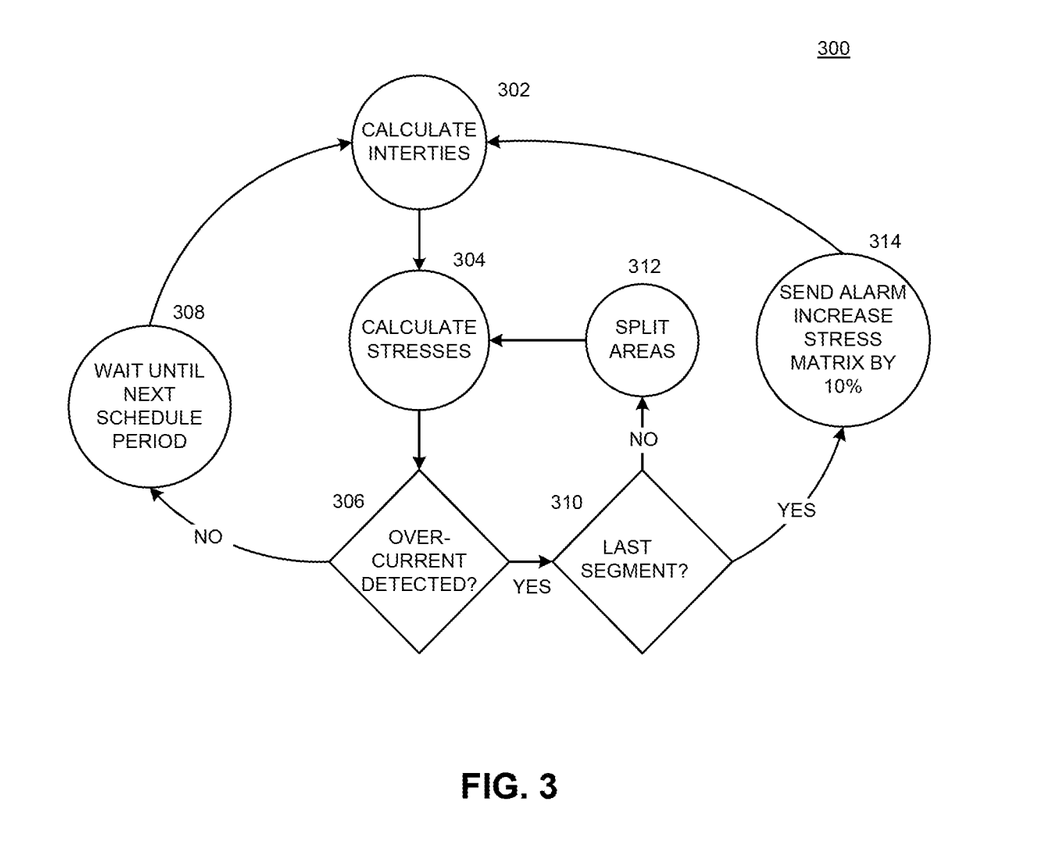
FIG. 3 is a state diagram illustrating states of the tertiary control technique described herein in accordance with one or more embodiments of the present invention.

This process can be described in state machine form with a diagram shown in FIG. 3.

FIG. 3 is a state diagram 300 illustrating states of the tertiary control technique described herein in accordance with one or more embodiments of the present invention. In one or more embodiments, the state diagram 300 depicts the states associated with the tertiary control as implemented by a tertiary control module 416 and outlined in a method 500, both described further below.

The system may begin at state 302 where the optimal interties for the area are calculated; in various embodiments, state 302 is entered upon receiving a new NET intertie target from an upstream controller. The system transitions from state 302 to state 304, where a stress calculation is done (using the computed optimal interties and the K-matrix) to compute the current on each segment of power line of the area. The system transitions to state 306 and determines whether any over-current is detected. If no over-current is detected, the system transitions to state 308 where the tertiary control commands are transmitted to be implemented. If, at state 306, over-current is detected, the system transitions to state 310.

At state 310, it's determined whether the last segment has been reached. If the last node has been reached, the system transitions to state 314. In state 314, an alarm is sent (e.g., indicating system wiring overload) and the stress matrix is increased, for example by 10%. The system transitions back to state 302.

At state 310, if it's determined that the last node has not been reached, the system transitions to state 312. At state 312, the area is divided in two areas—a first area having those resources/loads which contribute to the current on the overloaded segments, and a second area having those resources/load which do not. Net target interties are computed separately for each of the areas, and the system transitions to state 304, where the stress is calculated again.

Figure 4:
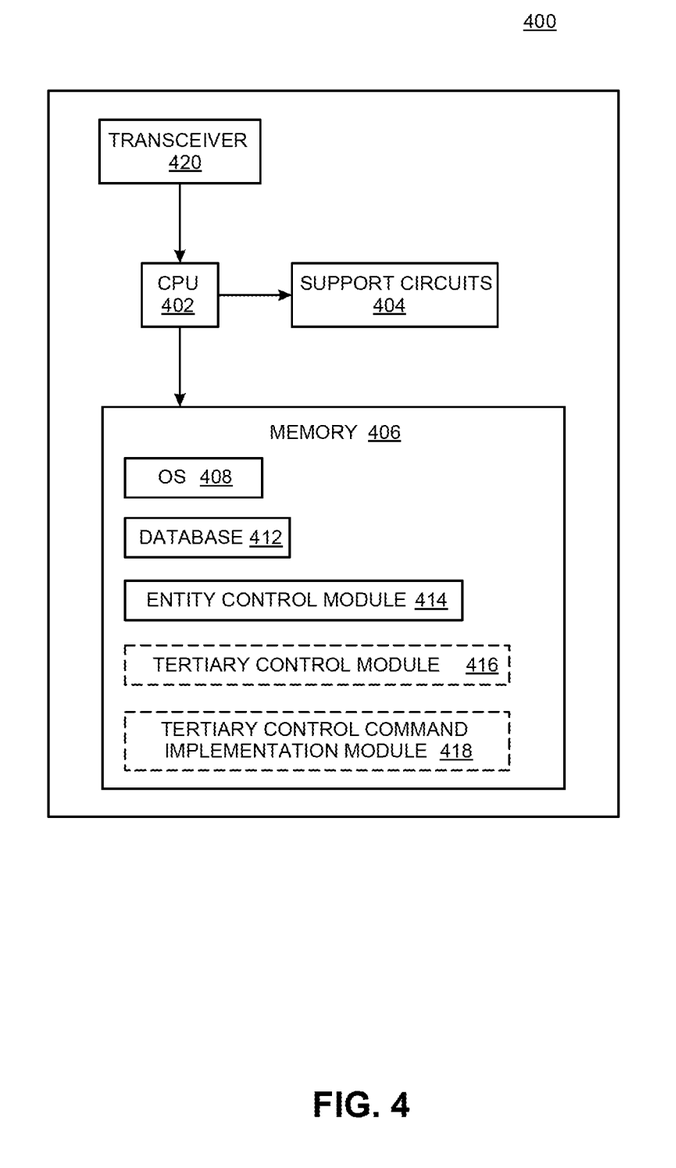
FIG. 4 is a block diagram of a controller in accordance with one or more embodiments of the present invention.

FIG. 4 is a block diagram of a controller 400 in accordance with one or more embodiments of the present invention. The controller 400 is analogous to the various controllers described above with respect to FIG. 1.

In one or more embodiments, the controller 400 is an area controller that comprises a tertiary control module for managing tertiary control in its area (which may also be referred to as a marketplace manager). The area controller controls its allocated resources but does not need to be physically located within the area it controls; in one or more embodiments, the area controller is able to control a physical disconnection from upstream equipment. The area controller comprises a tertiary control module (described below) and in various embodiments also comprises a primary control module for implementing primary control and/or a secondary control module for implementing secondary control. Any of the controllers described above with respect to FIG. 1 may be area controllers, with each area controller managing its downstream resources within a hierarchy of area controllers in the system 100. For example, the controller 108 may be an area controller that manages the resources of microgrid member 152-1, with each of the microgrid members 152-2 through 152-M in the microgrid 150-1 having similar area controllers, and the master controller 170 is an area controller than manages the resources of the microgrid 150-1. In other embodiments, one or more additional controllers not shown in FIG. 1 may be present and act as area controllers for various areas of the system 100; for example, another controller may be present and act as the area controller for the microgrid member 152-1 (for example, a controller 160 (shown in phantom) coupled between the local MID 122 and the local grid 134). An area controller may communicate with its resources via any suitable communication technique, such as wired (e.g., power line communication) and/or wireless techniques.

The controller 400 comprises support circuits 404, one or more transceivers 420, and a memory 406, each coupled to a central processing unit (CPU) 402. The one or more transceivers 420 communicate with other devices in the system 100 by any suitable wired and/or wireless communications technique (e.g., power line communication). The CPU 402 may comprise one or more conventionally available microprocessors or microcontrollers; alternatively, the CPU 402 may include one or more application specific integrated circuits (ASICs). The support circuits 404 are well known circuits used to promote functionality of the CPU 402. Such circuits include, but are not limited to, a cache, power supplies, clock circuits, buses, input/output (I/O) circuits, and the like. The controller 400 may be implemented using a general purpose computer that, when executing particular software, becomes a specific purpose computer for performing various embodiments of the present invention. In other embodiments, the CPU 402 may be a microcontroller comprising internal memory for storing controller firmware that, when executed, provides the controller functionality described herein. The controller 400 may be composed of hardware, firmware, local software, or cloud software, or any combination thereof.

The memory 406 may comprise random access memory, read only memory, removable disk memory, flash memory, and various combinations of these types of memory. The memory 406 is sometimes referred to as main memory and may, in part, be used as cache memory or buffer memory. The memory 406 generally stores an operating system (OS) 408, if necessary, that can be supported by the CPU capabilities. In some embodiments, the OS 408 may be one of a number of commercially available operating systems such as, but not limited to, LINUX, Real-Time Operating System (RTOS), and the like. The memory 406 further stores non-transient processor-executable instructions and/or data that may be executed by and/or used by the CPU 402. These processor-executable instructions may comprise firmware, software, and the like, or some combination thereof. The memory 406 may additionally store a database 412 for storing data, such as data related to the present invention (e.g., stress thresholds).

The memory 406 stores various forms of application software, such as an entity control module 414 for controlling one or more entities associated with the controller 400. For example, when the control module 400 is a power conditioner controller 140, the entity control module 414 controls power conversion in the corresponding power conditioner 110.

In those embodiments where the controller 400 is an area controller, the memory 406 further comprises a tertiary control module 416 for implementing tertiary control functions as described herein. In those embodiments where the controller 400 controls a resource that receives and implements secondary control commands, the memory 406 further comprises a tertiary control command implementation module 418 which implements the received secondary control commands as described herein.

Figure 5:
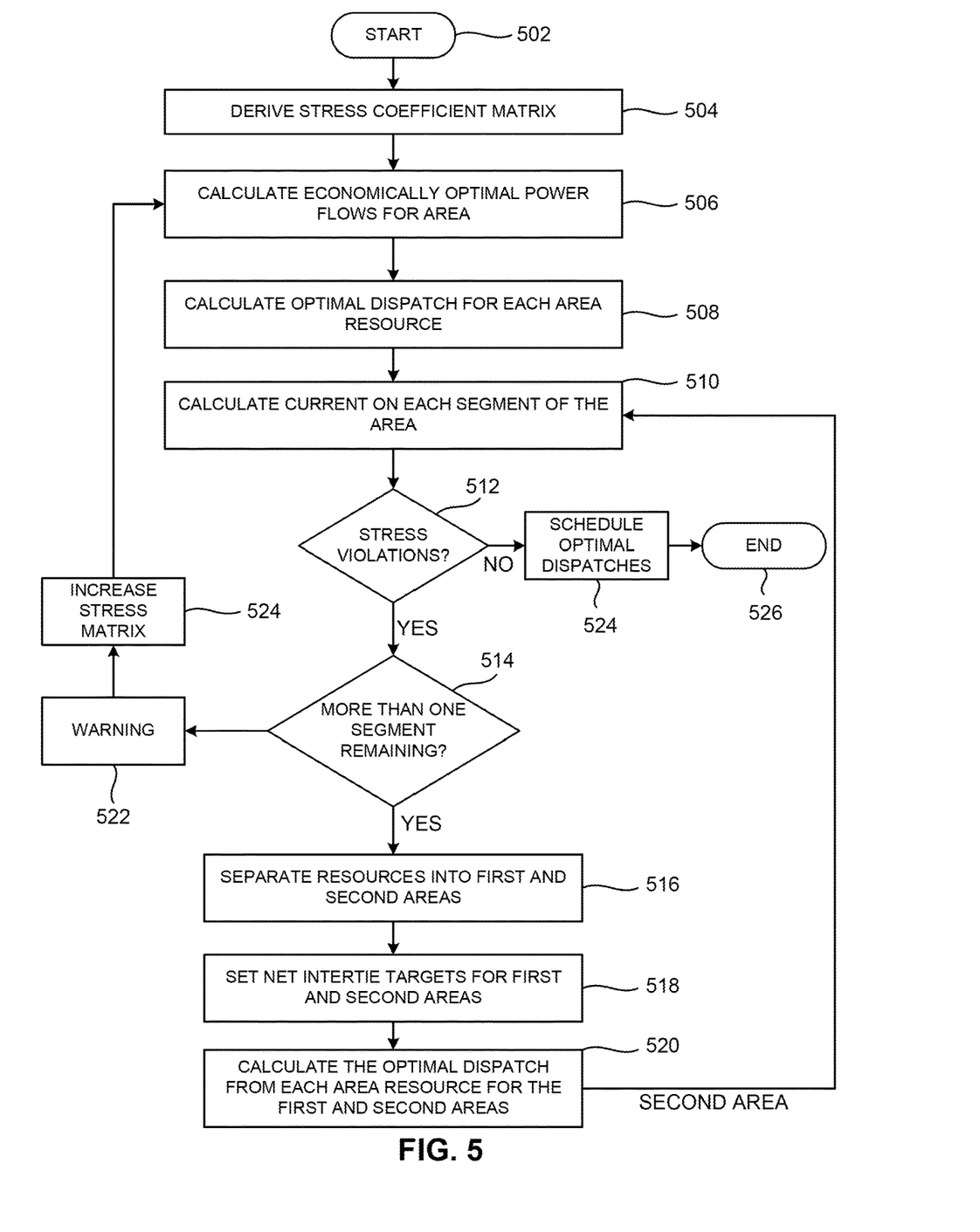
FIG. 5 is a flow diagram of a method for distributed resource-constrained optimization.

FIG. 5 is a flow diagram of a method 500 for distributed resource-constrained optimization, in accordance with one or more embodiments of the present invention. In some embodiments, the method 500 may be performed with respect to the system 100, which may itself be an area of a power distribution network and/or have multiple hierarchical areas within it. In other embodiments, the method 500 may be performed with respect to the power network area is shown in FIG. 2. In various embodiments, the method 500 is an implementation of the tertiary control module 416 (which may also be referred to as a marketplace manager for its area) described above. In certain embodiments, a computer readable medium comprises a program that, when executed by a processor (such as a processor described above), performs the method 500.

The method 500 starts at step 502 and proceeds to step 504. At step 504, a stress coefficient matrix is derived for an area of a power distribution network. The stress coefficient matrix, which may also be referred to herein as a "K-matrix", comprises information on the contribution current injection on each bus has to the overall current on each segment of the power network is derived for the area. As previously described, the K-matrix is an M×N matrix where M is the number of segments in the system area (the number of power line segments) and N is the number of buses on the system area with a current injection. One example of a K-matrix is shown above in Equation (1).

The method 500 proceeds to step 506. At step 506 (corresponding to state 302 in the state diagram 300), all local network constraints are ignored and the economically optimal power flows for the area (which may also be referred to as the unconstrained net intertie targets or the unconstrained net intertie schedules) are calculated. For example, in the exemplary embodiment previously described with respect to FIG. 2, the optimal power flow for the area is determined to be 0 A. The method 500 proceeds to step 508.

At step 508 (corresponding to state 302 in the state diagram 300), the optimal dispatch from each resource in the area (which may also be referred to as the scheduled current for each resource) is computed to achieve the economically optimal power flows for the area. For example, in the exemplary embodiment previously described with respect to FIG. 2, the optimal dispatches for resources 1, 2 and 3 are computed as +20 A, +30 A, and −50 A, respectively. The method 500 proceeds to step 510.

At step 510 (corresponding to state 304 in the state diagram 300), a stress calculation is performed to calculate the current on each power line segment in the area. The stress calculation is done using the K-matrix determined at step 504, and the optimal dispatches computed at step 508. One example of a stress calculation is shown above in Equation (2).

At step 512 (corresponding to state 306 in the state diagram 300), a determination is made whether any of the calculated currents for the power line segments exceed corresponding stress thresholds. The determination may be made by comparing the computed optimal current on each segment to allowable current levels. In some embodiments, one or more of the allowable levels (i.e., stress thresholds) may be based on a dynamic limit calculation; for example, one or more of the allowable levels may be time dependent, temperature dependent, or the like. If the result of the determination is no, that none of the calculated scheduled currents violate corresponding stress thresholds, the method 500 proceeds to step 524 where the calculated optimal resource dispatches are scheduled for implementation in accordance with the tertiary control for the area. For example, commands for implementing the optimal dispatches (i.e., the intertie schedules) may be transmitted to the controllable current generating/consuming resources of the microgrid member 152-1, such as the power conditioners 110, the generator 130, and the smart loads 118. The method 500 then proceeds to step 526 where it ends.

If, at step 512, the result of the determination is yes, that one or more of the calculated currents for the power line segments exceed corresponding stress thresholds, the method 500 proceeds to step 514 (corresponding to state 310 in the state diagram 300). At step 514, a determination is made whether there is more than a single row remaining in the K-matrix (i.e., whether that is more than a single segment remaining in the analysis). If the result of the determination is yes, that there is only a single row remaining in the K-matrix, then the single remaining segment is overloaded and therefore there is no solution which meets the stress requirement. The method 500 then proceeds to step 520 (corresponding to state 314 in the state diagram 300), where an emergency warning is generated to indicate system wiring overload. The method 500 then proceeds to step 522 (corresponding to state 314 in the state diagram 300), where the stress matrix (i.e., the K-matrix) is increased (for example, by 10%) and the method 500 returns to step 506.

If, at step 514, the result of the determination is yes, that more than a single row remains, the method 500 proceeds to step 516 (corresponding to state 312 in the state diagram 300); after the stress calculation has been initially made with all resources and the K-matrix, the method 500 segments into groups and limits the one which was over a threshold, and sets a new net for the second group such that the total net remains the same. At step 516, the area is split into two new areas. A first area is defined as comprising those resources/loads which contribute to the current on the overloaded segments, and a second area is defined as comprising those which do not. The method 500 proceeds to step 518.

At step 518, net intertie targets are separately set for the first and second areas. For the first area, the net intertie target (which may be in terms of power or current) is set to the corresponding stress limit; for the second area, the net intertie target is set such that the total net current of the first and the second areas is unchanged from the original net target intertie for the original area. The method 500 proceeds to step 520.

At step 520, the optimal dispatches from each resource in terms of the net intertie targets for the first and second areas is calculated. The method 500 then returns to step 510 to repeat the stress calculation on the second area only, although in some other embodiments the stress calculation may be repeated using both areas (e.g., as described above with respect to FIG. 2). To perform the stress calculation on the second area, the K-matrix rows pertaining to the first area are removed from the K-matrix and the resource currents. The method 500 then continues to step 512.

In one or more embodiments, the K-matrix may initially be reduced by removing all rows which have a duplicate that has the same or lower max current allowance (i.e. only the weakest link needs to be protected).

While the foregoing is directed to embodiments of the present invention, other and further embodiments of the invention may be devised without departing from the basic scope thereof, and the scope is defined by the claims that follow.

The invention claimed is:

1. A method for tertiary control with over-current protection, comprising:
    calculating, at an upstream controller, at least one unconstrained optimal net intertie target for an area of a power distribution network;
    transmitting the calculated at least one constrained optimal net intertie from the upstream controller to a downstream controller;
    calculating, at a downstream controller, for each resource of a plurality of resources within the area, optimal scheduled current to achieve the at least one unconstrained optimal net intertie target;
    calculating, using the optimal scheduled currents and a plurality of stress coefficients, net scheduled current for each power line segment within the area;
    comparing the net scheduled currents to corresponding stress thresholds to identify any stress violations; and
    when the comparing step identifies one or more stress violations:
        when no power line segment remains within the area, transmitting a warning from the downstream controller to the upstream controller for increasing the at least one unconstrained optimal net intertie target; or
        when a power line segment remains within the area, reducing the optimal scheduled current for one or more resources, of the plurality of resources, contributing to the one or more stress violations and calculating updated optimal scheduled current for one or more resources, of the plurality of resources, not contributing to the one or more stress violations.

2. The method of claim 1, further comprising:
    determining a first net intertie target for a first area comprising the one or more resources contributing to the one or more stress violations; and
    determining a second net intertie target for a second area comprising the one or more resources not contributing to the one of more stress violations.

3. The method of claim 2, wherein the updated optimal scheduled current is calculated to achieve the second net intertie target.

4. The method of claim 2, wherein net current for the first and the second net intertie targets is equal to net current for the at least one unconstrained optimal net intertie target.

5. The method of claim 2, wherein the first net intertie target is equal to a stress threshold corresponding to the one or more stress violations.

6. The method of claim 1, wherein the plurality of stress coefficients are in the form an M×N matrix where M is the number of power line segments in the area and N is the number of buses in the area with a current injection.

7. The method of claim 1, wherein one or more of the corresponding stress thresholds is based on a dynamic limit calculation.

8. An apparatus for tertiary control with over-current protection, comprising:
    a controller, comprising at least one processor, for:
        calculating, at an upstream controller, at least one unconstrained optimal net intertie target for an area of a power distribution network;
        transmitting the calculated at least one constrained optimal net intertie from the upstream controller to a downstream controller;
        calculating, at a downstream controller, for each resource of a plurality of resources within the area, optimal scheduled current to achieve the at least one unconstrained optimal net intertie target;
        calculating, using the optimal scheduled currents and a plurality of stress coefficients, net scheduled current for each power line segment within the area;
        comparing the net scheduled currents to corresponding stress thresholds to identify any stress violations; and
        when the comparing step identifies one or more stress violations:
            when no power line segment remains within the area, transmitting a warning from the downstream controller to the upstream controller for increasing the at least one unconstrained optimal net intertie target; or
            when a power line segment remains within the area, reducing, when the comparing step identifies one or more stress violations, the optimal scheduled current for one or more resources, of the plurality of resources, contributing to the one or more stress violations and calculating, when the comparing step identifies the one or more stress violations, updated optimal scheduled current for one or more resources, of the plurality of resources, not contributing to the one or more stress violations.

9. The apparatus of claim 8, wherein the controller further:
    determines a first net intertie target for a first area comprising the one or more resources contributing to the one or more stress violations; and
    determines a second net intertie target for a second area comprising the one or more resources not contributing to the one of more stress violations.

10. The apparatus of claim 9, wherein the updated optimal scheduled current is calculated to achieve the second net intertie target.

11. The apparatus of claim 9, wherein net current for the first and the second net intertie targets is equal to net current for the at least one unconstrained optimal net intertie target.

12. The apparatus of claim 9, wherein the first net intertie target is equal to a stress threshold corresponding to the one or more stress violations.

13. The apparatus of claim 8, wherein the plurality of stress coefficients are in the form an M×N matrix where M is the number of power line segments in the area and N is the number of buses in the area with a current injection.

14. The apparatus of claim 8, wherein one or more of the corresponding stress thresholds is based on a dynamic limit calculation.

15. A computer readable medium comprising a program that, when executed by a processor, performs a method for tertiary control with over-current protection, the method comprising:
 calculating, at an upstream controller, at least one unconstrained optimal net intertie target for an area of a power distribution network;
 transmitting the calculated at least one constrained optimal net intertie from the upstream controller to a downstream controller;
 calculating, at a downstream controller, for each resource of a plurality of resources within the area, optimal scheduled current to achieve the at least one unconstrained optimal net intertie target;
 calculating, using the optimal scheduled currents and a plurality of stress coefficients, net scheduled current for each power line segment within the area;
 comparing the net scheduled currents to corresponding stress thresholds to identify any stress violations; and
 when the comparing step identifies one or more stress violations:
  when no power line segment remains within the area, transmitting a warning from the downstream controller to the upstream controller for increasing the at least one unconstrained optimal net intertie target; or
  when a power line segment remains within the area, reducing, when the comparing step identifies one or more stress violations, the optimal scheduled current for one or more resources, of the plurality of resources, contributing to the one or more stress violations and calculating, when the comparing step identifies the one or more stress violations, updated optimal scheduled current for one or more resources, of the plurality of resources, not contributing to the one or more stress violations.

16. The computer readable medium of claim 15, the method further comprising:
 determining a first net intertie target for a first area comprising the one or more resources contributing to the one or more stress violations; and
 determining a second net intertie target for a second area comprising the one or more resources not contributing to the one of more stress violations.

17. The computer readable medium of claim 16, wherein the updated optimal scheduled current is calculated to achieve the second net intertie target.

18. The computer readable medium of claim 16, wherein net current for the first and the second net intertie targets is equal to net current for the at least one unconstrained optimal net intertie target.

19. The computer readable medium of claim 16, wherein the first net intertie target is equal to a stress threshold corresponding to the one or more stress violations.

20. The computer readable medium of claim 15, wherein the plurality of stress coefficients are in the form an M×N matrix where M is the number of power line segments in the area and N is the number of buses in the area with a current injection.

* * * * *